Patented Dec. 9, 1930

1,784,408

UNITED STATES PATENT OFFICE

ARTHUR ZITSCHER, OF OFFENBACH-ON-THE-MAIN, GERMANY, ASSIGNOR TO GENERAL ANILINE WORKS, INC., OF NEW YORK, N. Y., A CORPORATION OF DELAWARE

PROCESS FOR MANUFACTURING AMINONAPHTHOL ETHERS

No Drawing. Application filed December 16, 1927, Serial No. 240,636, and in Germany January 3, 1927.

The present invention relates to a process for manufacturing aminonaphtholethers and to new 2.3-aminonaphtholethers obtainable thereby.

I have found that aminonaphtholethers are obtained in a very simple manner by treating hydroxy-naphthalenecarboxyamides with alkylating agents and subjecting the naphtholethercarboxyamides, thus obtained, to the action of alkali metal salts of the hypochlorous or hypobromous acid according to Hofmann's decomposition reaction.

It was by no means to be foreseen that the alkylation of the hydroxynaphthalenecarboxyamides would take place smoothly. It was much more to be expected that a reaction of the alkaline alkylating agent with the carboxyamide group would take place.

In this manner a series of aminonaphtholethers and their nuclear substitution products is very readily produced which are otherwise obtainable only in a complicated way.

In order to further illustrate my invention the following examples are given, the parts being by weight and all temperatures in centigrade degrees, but it is to be understood that my invention is not limited to the particular products or reacting conditions mentioned therein.

*Example 1.*—140 parts of dimethylsulfate and a solution of 187 parts of 2.3-hydroxynaphthoyl-amide in aqueous caustic soda solution are heated to boiling for about 2 hours, while well stirring. After cooling down, the reaction product is filtered, washed and dried. The 2.3-methoxynaphthoylamide thus, obtained in a good yield, crystallizes from dilute methyl alcohol as fine colorless needles of the melting point 170° (uncor.)

201 parts of this 2.3-methoxynaphthoylamide are dissolved in methyl alcohol and mixed in the cold with a solution of hypochlorite of sodium containing 71 parts of free chlorine. To the resulting solution a concentrated caustic soda solution is added and the most of the methyl alcohol is distilled off. The mass is diluted with water and the precipitated 2.3-aminonaphtholmethylether, thus formed in an excellent yield, is suitably purified by forming the hydrochloride. The free base of the formula:

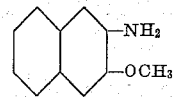

crystallizes from ligroine as colorless brilliant needles of the melting point 107° (uncor.)

*Example 2.*—187 parts of 1.2-hydroxynaphthoylamide dissolved in a caustic soda solution and 220 parts of p-toluenesulphonic acid ethylester are heated to boiling for about 3 hours. After cooling down, the 1.2-ethoxynaphthoylamide thus formed in an excellent yield is filtered off. It crystallizes from dilute alcohol as light yellowish needles of the melting point 154° (uncor.)

This 1.2-ethoxynaphthoylamide, when subjected to Hofmann's decomposition reaction according to Example 1, yields 2.1-aminonaphtholethylether of the formula:

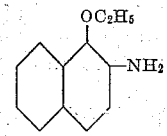

crystallizing from dilute alcohol as brilliant colorless lamellas of the melting point 48-49°.

*Example 3.*—187 parts of 2.6-hydroxynapthoylamide, obtained from 2.6-hydroxynaphthoylchloride and ammonia as colorless lamellas of the melting point 209° (uncor.), are dissolved in caustic soda solution and heated to boiling with 133 parts of benzylchloride for about 2 hours. The excess of the benzyl-chloride is removed by means of steam and the 2.6-benzylhydroxynaphthoylamide, thus obtained in an excellent yield, is filtered off after cooling. It crystallizes from dilute acetic acid as colorless needles of the melting point 198° (uncor.)

By Hofmann's decomposition reaction the 2.6-aminonaphtholbenzylether of the formula:

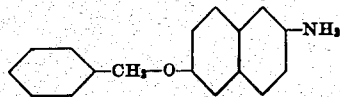

is formed which crystallizes from toluene as colorless lamellas of the melting point 176° (uncor.)

In the same manner 2.6-methoxynaphthoylamide, in the form of colorless long spits of the melting point 224° (uncor.) when crystallized from dilute alcohol, produces the 2.6-aminonaphtholmethylether crystallizing from ligroine as brilliant needles connected to bunches of the melting point 156–157° (uncor.)

In the same way the process may be carried out with other hydroxynaphthoylamides and their nuclear substitution products.

In the following claims the terms "alkylating agent", "alkoxygroup" and "alkyl" are intended to comprise also "aralkylating agents", "aralkoxy groups" and "aralkyl" respectively.

I claim:

1. Process for manufacturing aminonaphtholethers which process comprises treating hydroxynaphthalenecarboxyamides with alkylating agents and subjecting the naphtholethercarboxyamides, thus obtained, to the action of alkali metal salts of the hypochlorous or hypobromous acid according to Hofmann's decomposition reaction.

2. As new compounds 2.3-aminonaphtholethers of the formula:

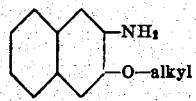

wherein the hydrogen atoms of the naphthalene nucleus may be replaced by monovalent substituents, being colorless crystalline products, having definite melting points.

3. As a new compound 2.3-aminonaphtholmethylether of the formula:

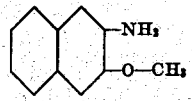

which crystallizes from ligroine in the form of colorless brilliant needles having a melting point of about 107° C.

In testimony whereof, I affix my signature.

ARTHUR ZITSCHER.